US008583706B2

(12) United States Patent
Mustonen et al.

(10) Patent No.: US 8,583,706 B2
(45) Date of Patent: *Nov. 12, 2013

(54) METHOD, FUNCTIONAL ARRANGEMENT AND SOFTWARE MEANS FOR SEARCHING AND PROCESSING INFORMATION WITH USER INTERFACE OF A TERMINAL IN WHICH AN ADDRESS FIELD AND VIRTUAL FUNCTION KEYS ARE MODIFIED TO CORRESPOND TO AN INVOKED SERVICE THROUGH DATA INPUT TO A BROWSER ADDRESS FIELD, AND CELLULAR NETWORK TERMINAL EMPLOYING THE METHOD

(75) Inventors: Mika P. Mustonen, Ii (FI); Markku Rytivaara, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/267,113

(22) Filed: Oct. 6, 2011

(65) Prior Publication Data
US 2012/0030608 A1  Feb. 2, 2012

Related U.S. Application Data

(63) Continuation of application No. 10/510,891, filed as application No. PCT/FI03/00220 on Mar. 21, 2003, now Pat. No. 8,065,344.

(30) Foreign Application Priority Data

Apr. 8, 2002  (FI) .................................. 20020664

(51) Int. Cl.
*G06F 17/30* (2006.01)
*G06F 15/16* (2006.01)

(52) U.S. Cl.
USPC .......................................... 707/805; 715/773

(58) Field of Classification Search
USPC ......... 707/705, 796, 803, 805, 999.01, 999.1, 707/999.102; 709/219, 228, 238, 239, 244; 717/171; 715/710, 711, 773, 810, 816, 715/825, 827, 841, 843
See application file for complete search history.

(56) References Cited

U.S. PATENT DOCUMENTS 5,841,849 A   11/1998   Macor
6,061,738 A    5/2000   Osaku et al.
(Continued)

FOREIGN PATENT DOCUMENTS

EP        0 891 066 A2      1/1999

OTHER PUBLICATIONS

"Tips for Faster Websurfing," Sep. 27, 2001, retrieved from Internet, www.tjordaan.uklinux.net/moveabletype/fblog/archives/000061. html, pp. 1-4.

(Continued)

*Primary Examiner* — Greta Robinson
(74) *Attorney, Agent, or Firm* — Ditthavong Mori & Steiner, P.C.

(57) ABSTRACT

The invention relates to a method for making it easier to carry out information search and processing with a communications device. Furthermore, the invention relates to a network browser employing the method and a www service at a server in a communications network as well as a cellular network terminal. In the method according to the invention, information entered in the address field of the network browser is utilized so that the address field with its virtual function keys is modified in accordance with the service used on the basis of information entered in the address field.

16 Claims, 4 Drawing Sheets

(56) References Cited

U.S. PATENT DOCUMENTS

| | | | |
|---|---|---|---|
| 6,510,153 | B1 | 1/2003 | Inoue et al. |
| 7,127,609 | B2 | 10/2006 | Royer et al. |
| 8,065,344 | B2 * | 11/2011 | Mustonen et al. ............ 707/805 |
| 2002/0038351 | A1 | 3/2002 | Khan et al. |
| 2002/0065109 | A1 | 5/2002 | Mansikkaniemi et al. |
| 2002/0075317 | A1 | 6/2002 | Dardick |
| 2002/0156870 | A1 * | 10/2002 | Boroumand et al. ......... 709/219 |

OTHER PUBLICATIONS

European Office action for corresponding EP App. No. 03 712 163.9 dated Apr. 7, 2011, pp. 1-10.

Henricksen et al., "Adapting the Web Interface: An Adaptive Web Browser," Proceedings 2nd Australian User Interface Conference, AUIC 2001, Jan. 29-Feb. 1, 2001, pp. 1-9.

Office Action for related U.S. Appl. No. 10/510,891, Feb. 7, 2010, pp. 1-11.

Office Action for related U.S. Appl. No. 10/510,891, Jan. 10, 2007, pp. 1-13.

Office Action for related U.S. Appl. No. 10/510,891, Jul. 14, 2006, pp. 1-14.

Office Action for related U.S. Appl. No. 10/510,891, Jul. 31, 2007, pp. 1-13.

Office Action for related U.S. Appl. No. 10/510,891, Jun. 4, 2009, pp. 1-19.

Office Action for related U.S. Appl. No. 10/510,891, Nov. 24, 2008, pp. 1-13.

Office Action for related U.S. Appl. No. 10/510,891, Oct. 26, 2010, pp. 1-21.

Search Report for corresponding Finnish Application No. 20020664, Jan. 10, 2003, 1 page.

* cited by examiner

METHOD, FUNCTIONAL ARRANGEMENT AND SOFTWARE MEANS FOR SEARCHING AND PROCESSING INFORMATION WITH USER INTERFACE OF A TERMINAL IN WHICH AN ADDRESS FIELD AND VIRTUAL FUNCTION KEYS ARE MODIFIED TO CORRESPOND TO AN INVOKED SERVICE THROUGH DATA INPUT TO A BROWSER ADDRESS FIELD, AND CELLULAR NETWORK TERMINAL EMPLOYING THE METHOD

RELATED APPLICATIONS

This application is a continuation of U.S. patent application Ser. No. 10/510,891, filed Oct. 8, 2004, and now U.S. Pat. No. 8,065,344, which is a national phase application of PCT Application No. PCT/FI03/00220, filed on Mar. 21, 2003, and claims priority to Finnish Application No. 20020664, filed Apr. 8, 2002; the contents of which are incorporated herein by reference in their entireties.

FIELD THE INVENTION

The invention relates to a method for making it easier to process user specific information at an information processing device, which method uses a network browser installed on said information processing device for searching, processing and presenting information, which network browser comprises at least an address field and virtual function keys associated with it. The invention further relates to a network browser employing the method, a world-wide-web service, located on a service provider's server, employing the method, and a cellular network terminal employing the method.

BACKGROUND OF THE INVENTION

Communications devices have become very versatile. One and the same device can be used for a wide range of functions. A device may be used for personal communication, to pay bills and to play games, for instance. Therefore it is desirable from the user's point of view that transitions from one application to another are smooth and easy. In a so-called IP (Internet Protocol) network, for example, a user may be linked to various applications and services which may be very different. These applications use various messages and operating instructions to guide the user in the correct use of the applications.

To make the use of computers easier a so-called graphic user interface has been developed. It means that various virtual function keys and menus are created on the display of an apparatus so that the user can use these keys and menus using either a separate mouse or keys of a keyboard connected to the computer.

To make navigation in IP networks easier so-called network browsers have been developed. A network browser is a program-based user interface comprising a standard-format graphic user interface. When using a network browser, the pages visited will be saved in the memory of the device, from where they can be retrieved by means of virtual keys in the network browser or by typing the address of a page in the address field in the network browser. In some browsers some of these virtual keys will change their appearance according to whether the function associated with a particular key can be used or not. In some browsers data entered in the address field will automatically start a search engine operating in the network, which search engine will then suggest a network address to connect to.

Attempts have been made to utilize the methods described above in mobile communications devices and portable computers as well. However, with these types of communications devices one will be faced with limitations caused by the physical size. The size of the display of a communications device of a cellular network, a portable computer or a palmtop computer is not comparable to that of the display of a device designed to be used in a fixed location such as an office. However, the user interfaces of various IP applications are mainly designed with such office equipment in mind. A device designed for office use has a large display and, additionally, there is sufficient desktop space for various accessories if needed. To use such a user interface in an apparatus which is smaller by an order of magnitude is difficult or even impossible.

However, more and more services, such as electronic banking and gaming applications, are being developed for, say, cellular terminals. Therefore, one and the same device has to be applicable to a wide range of uses, and the user interfaces of the devices may differ considerably. It is difficult for a user to master all the functions and commands required in the various user interfaces. In the worst case, an application may crash because of an incorrect input from the user. Moreover, a transition from a user interface required by an application to another user interface required by a second application may take an unreasonably long time from the user's point of view. These factors contribute to users' reluctance to utilize the various already existing service applications.

SUMMARY OF THE INVENTION

An object of the present invention is to provide a user interface for an information processing device to make it easier for an individual user to move between applications used in one and the same device.

The objects of the invention are achieved by a procedure in which the network browser address field used for navigation either locally at the information processing device or in data networks is adapted so as to be context sensitive/variable. As a user enters in the address field according to the invention information needed in the application used, the various virtual function keys and/or menus associated with the address field change into application specific function keys/menus needed in that particular application. Depending on the application, modification of the address field is done controlled by the device itself or by the application server to which the information processing device is connected.

An advantage of the invention is that the network browser address field on the display of an information processing device with its control keys/menus is changed according to the user's needs without any special activity on the user's part.

Another advantage of the invention is that moving between applications becomes quicker since the user need not remember or carry out any special control procedures in order to verify the transition.

A further advantage of the invention is that the user can input information more quickly because he can start direct with the information input required by the function/service.

A further advantage of the invention is that the address field of the network browser can be flexibly utilized for user guidance; the address field may serve as a pre-filled form which directly guides the user in that particular service application.

An additional advantage of the invention is that it can be effectively utilized in devices with small displays.

A method according to the invention is characterized in that the address field and virtual function keys of the network browser used in the method are modified in accordance with the service used.

A network browser according to the invention is characterized in that the address field and virtual function keys of the network browser are adapted so as to be modified in accordance with the service used.

A www page according to the invention is characterized in that it comprises software means, associated with the www page, for modifying the address field and associated virtual function keys of a network browser intended for using said www page, in accordance with the service provided on said www page.

A terminal according to the invention is characterized in that the control unit in the terminal comprises software means for modifying the user interface of the terminal in accordance with the service used.

Advantageous embodiments of the invention are specified in the dependent claims.

The idea of the invention is basically as follows: The address field and associated virtual control keys or menus of a network browser used at an information processing device are adapted so as to depend on the contents of a service, such as a www page, or on the context of the information entered in the network browsers' address field shown on the display of the information processing device. When the user is connected to a service, such as a www page, or inputting data in the network browser's address field in a certain context, the "intellect" of the device or that of the service connected with the device is able to determine which service/function the user wants to use at that moment. The information processing device will adapt the network browser display and associated function keys under the control of the server providing the service in question. Alternatively, the device controls the network browser itself. Depending on the application, the network browser's address field displayed by the terminal may turn for example into a prefilled form to be filled out by the user on the basis of instructions given to him. It can be used to establish a connection to a bank in order to carry out a transaction specified by the user.

BRIEF DESCRIPTION OF THE DRAWINGS

The invention will now be described in more detail with reference to the preferred embodiments presented by way of example and to the accompanying drawing wherein.

DETAILED DESCRIPTION OF THE INVENTION

An information processing device connected to a data communications network employs an adaptive address field according to the invention in the network browser it uses. When data is input in the network browser's address field according to the invention, either the terminal itself or the server providing the service decides on how the data input should be interpreted. Based on this interpretation the adaptive address field according to the invention goes into a mode in which service specific operation is supported. Likewise, the function keys and/or menus associated with the address field turn into keys/menus needed in that particular service.

Figure 1A:
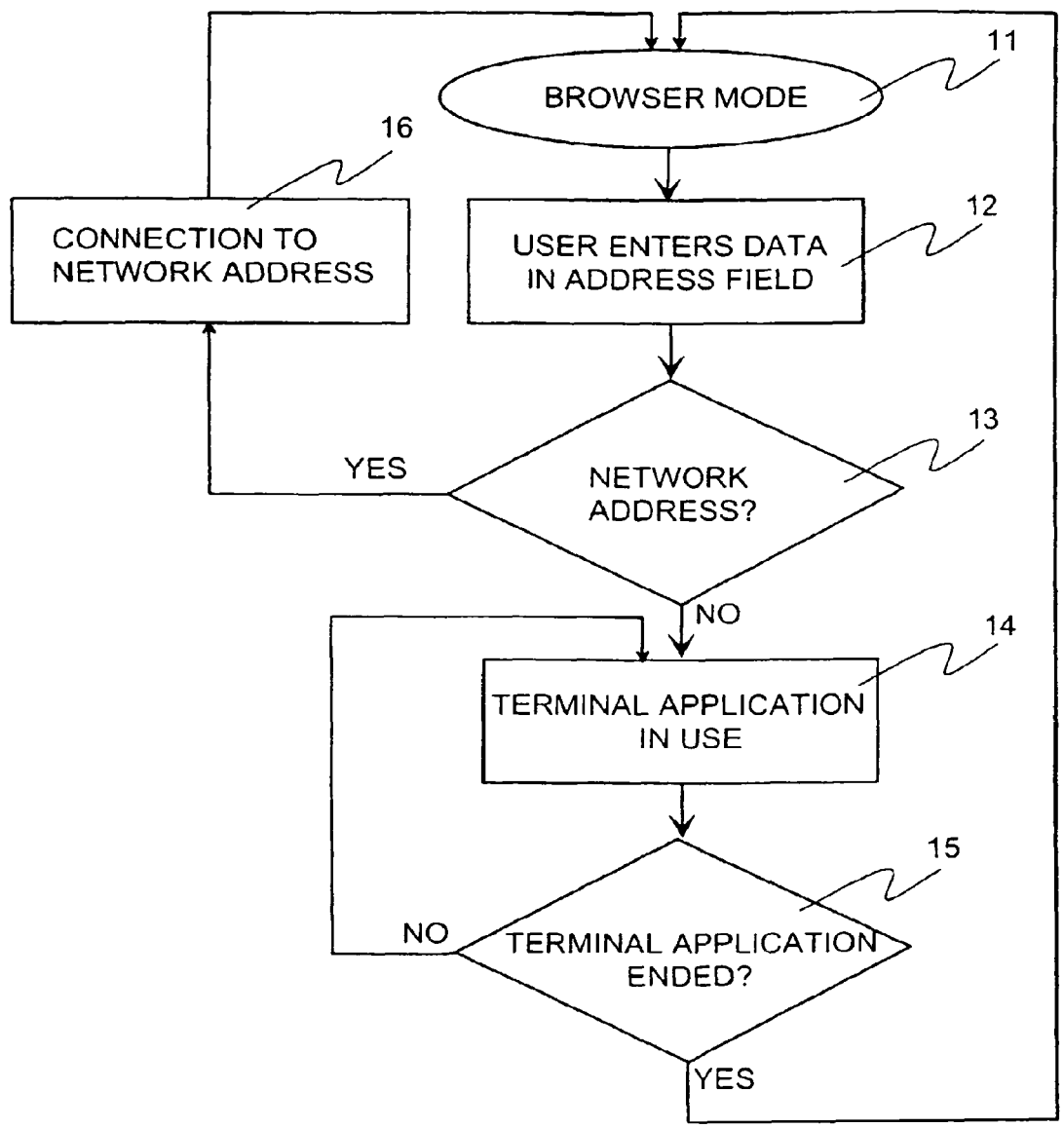
FIG. 1a is an exemplary flow diagram illustrating the use of a method according to the invention in the off-line state of an information processing device.

FIG. 1a is an exemplary flow diagram illustrating how the adaptive address field according to the invention can be utilized. The example may involve any information processing device which in some way or another is capable of establishing a communications connection with another device, say, a particular server.

Initially, in state 11, the device is in a mode according to the invention and the network browser displayed by the device has been set to a display mode according to the invention. In step 12 the user enters in the address field information relating to the service he wants to use. A check is made in step 13 to find out whether a server's network address or the like was entered in the address field. If a network address is recognized, the terminal begins to function as a network browser according to the invention, step 16. The network browser establishes a connection to the server in question, and the services provided by the server can be used, through the browser function, as long as necessary, step 11. The network browser may operate either as a browser according to the prior art or as an adaptive browser according to the invention, as will be described later on in conjunction with the description of FIG. 1*b*.

If in step 13 it is detected that the input does not comprise a network address, the software application installed at the terminal decides how the appearance of the browser displayed at the terminal should be changed so that the action required by the user could be easily accomplished. In step 14 the network browser at the terminal is in an adaptive state according to the invention. In that state the user of the terminal is provided with a user interface suitable for that particular service with special function keys and/or menus.

The information processing device continuously monitors, reference 15, whether the application, which was started, is in use. If the application is in use, operation continues in accordance with the service. If, however, it is detected that this particular service has ended, the network browser at the terminal comes back on, step 11.

Figure 1B:
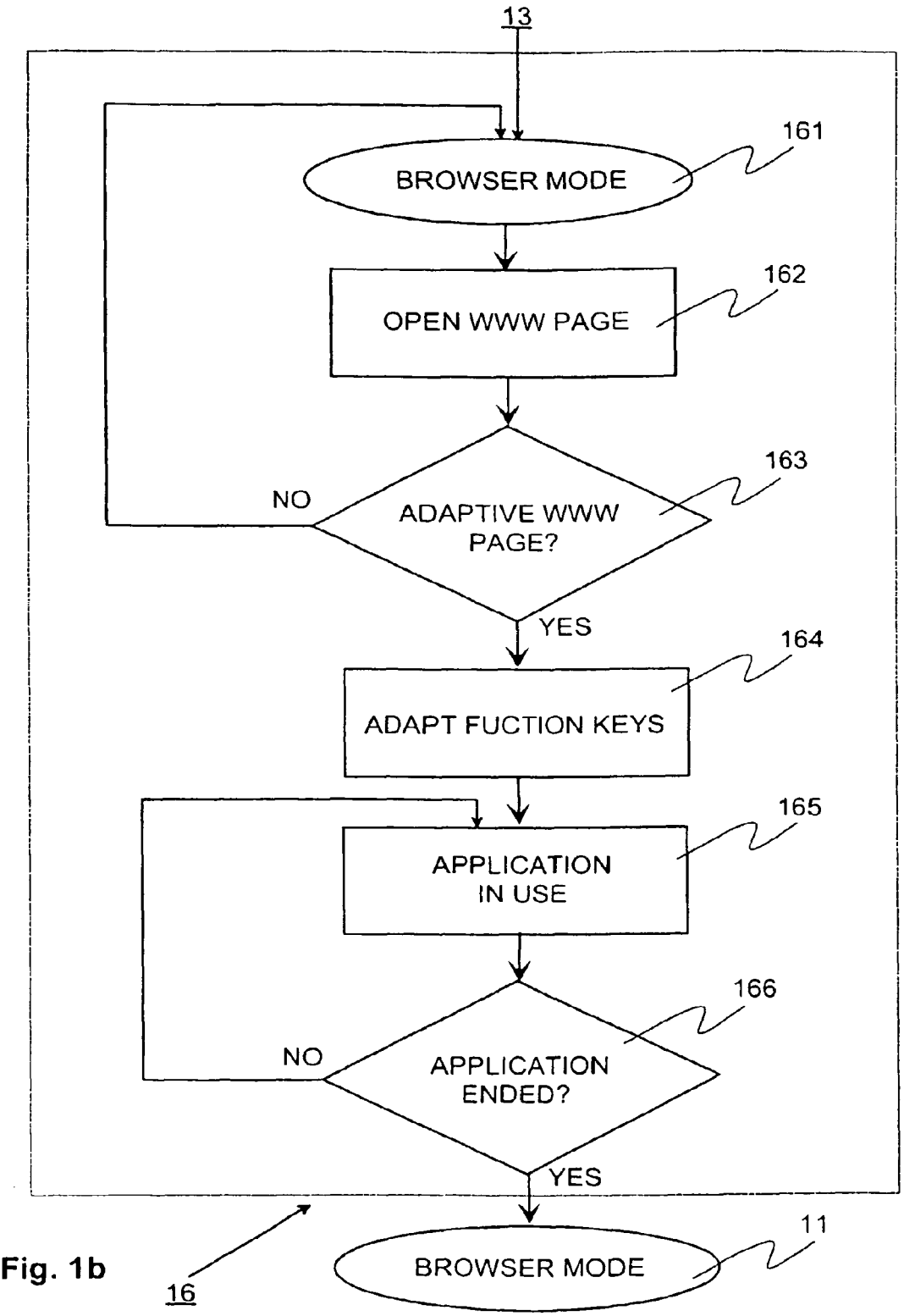
FIG. 1b is an exemplary flow diagram illustrating the use of a method according to the invention in the on-line state of an information processing device connected to a server.

FIG. 1*b* illustrates in a more detailed manner the operation of block 16 shown in FIG. 1*a*. The YES branch of the check step 13 in FIG. 1*a* leads to the internal starting step 161 of block 16, where the browser function of the terminal is started. In step 162, a desired www (world-wide web) page is opened.

In step 163 it is checked whether the selected www page supports the adaptive operating mode according to the invention, i.e. whether a software application supporting the invention is attached to the www page. If the www page does not support an adaptive address field according to the invention, the network browser returns to step 161, in which it operates in a mode according to the prior art.

If step 163 returns information indicating that the selected www page supports operation according to the invention, the function keys and/or menus in the graphic user interface of the terminal are adapted in step 164 in accordance with the application used. The service application in question is in use in step 165. From time to time it is checked, reference 166, whether the desired service is still in use. If use of the service has not ended, the process returns to step 165 and use of the service continues. If, however, it is detected in step 166 that the service in question is no more in use, the network browser at the terminal is instructed to function in the conventional manner, reference 11.

Figure 2A:
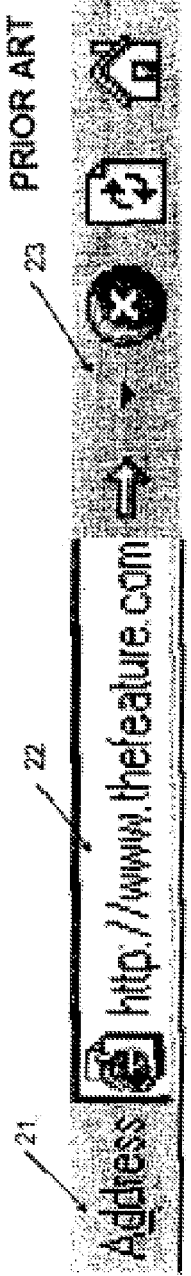
FIG. 2a shows an example of a prior-art network browser's address field with associated function keys.

FIG. 2a shows the address field 22 of a browser according to the prior art with associated function descriptions 21 and exemplary function keys 23. When the user wants to connect to a server, he enters the address in some form or another in the field 22. To the left of the address field there is a field 21 which indicates an address field. Furthermore, to the right of the address field 22 there are five exemplary virtual function keys 23.

Figure 2B:
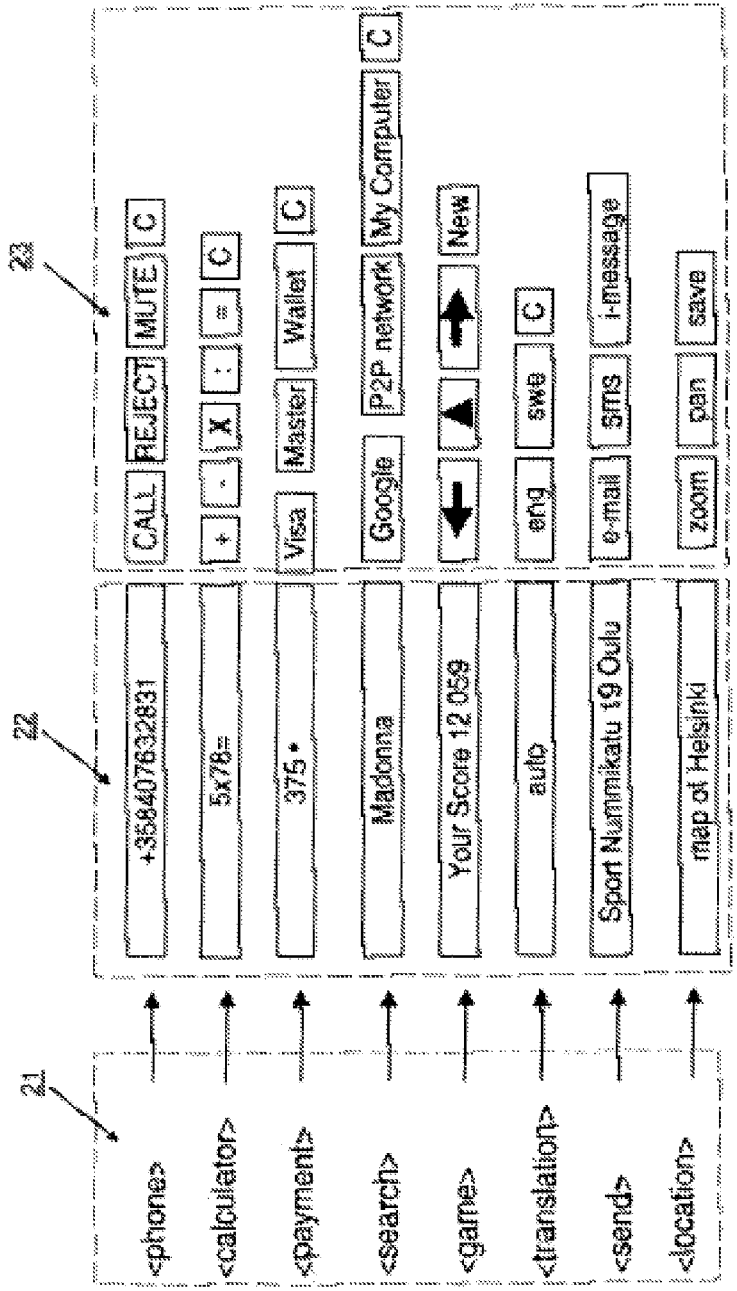
FIG. 2b shows examples of adaptive network browser address fields according to the invention with associated function keys.

FIG. 2b shows some exemplary services and associated virtual function keys 23 adapted in accordance with the invention. The function description field 21 lists as examples a phone mode, calculator mode, payment mode, search mode, game application, translation service, send mode, and location mode. Some of these exemplary functions, like the calculator mode, can be executed at the terminal, while others require a connection to a server.

When the user of the terminal in the first example enters in the address field according to the invention digits that can be interpreted to be a phone number, the function keys are adapted such that they can be used to make and reject a call, mute the device and clear a digit entered in the address field.

In the second example, digits and a mathematical operator are entered in the address field. In this example the address field turns into a calculator where basic calculations shown in FIG. 2b can be executed, such as "add", "subtract", "multiply", "divide", "equals", or the contents of the address field can be cleared.

The third example involves a payment transaction. Using the function keys 23 the user can select a method of payment which in this example may be Visa, MasterCard or electronic wallet. Naturally the user may cancel the transaction with the C key.

The fourth example illustrates how a search mode alters the network browser's function keys according to the invention. The user can select a known search engine or he may do a local search at his own terminal.

In the fifth example the information processing device is used for playing a game. The function keys displayed have been altered such that the user can easily play a game.

The sixth example involves the use of a translation engine. The user enters in the address field 22 a word to be translated and selects a target language with function keys 23. As in the previous examples, the user may clear the address field with the C key.

The seventh example involves the sending of a piece of information or such to a recipient. A name or address of a recipient causes the function keys to turn into keys describing various message sending methods.

In example number eight, map information is displayed at the device. As a map application is started, the function keys turn into keys with which the user can easily zoom in or out on the map view or possible save a map at the information processing device.

The network browser address field according to the invention with adaptive virtual keys is advantageously used in various mobile terminals where the size of the display is usually small. A connection may be established to a www page, for example, which contains hyperlinks or fields to be filled out. Using the address field according to the invention, all the necessary information can always be fed to the server in the maximum size allowed by the display. This arrangement makes the use of the terminal considerably easier.

Figure 3:
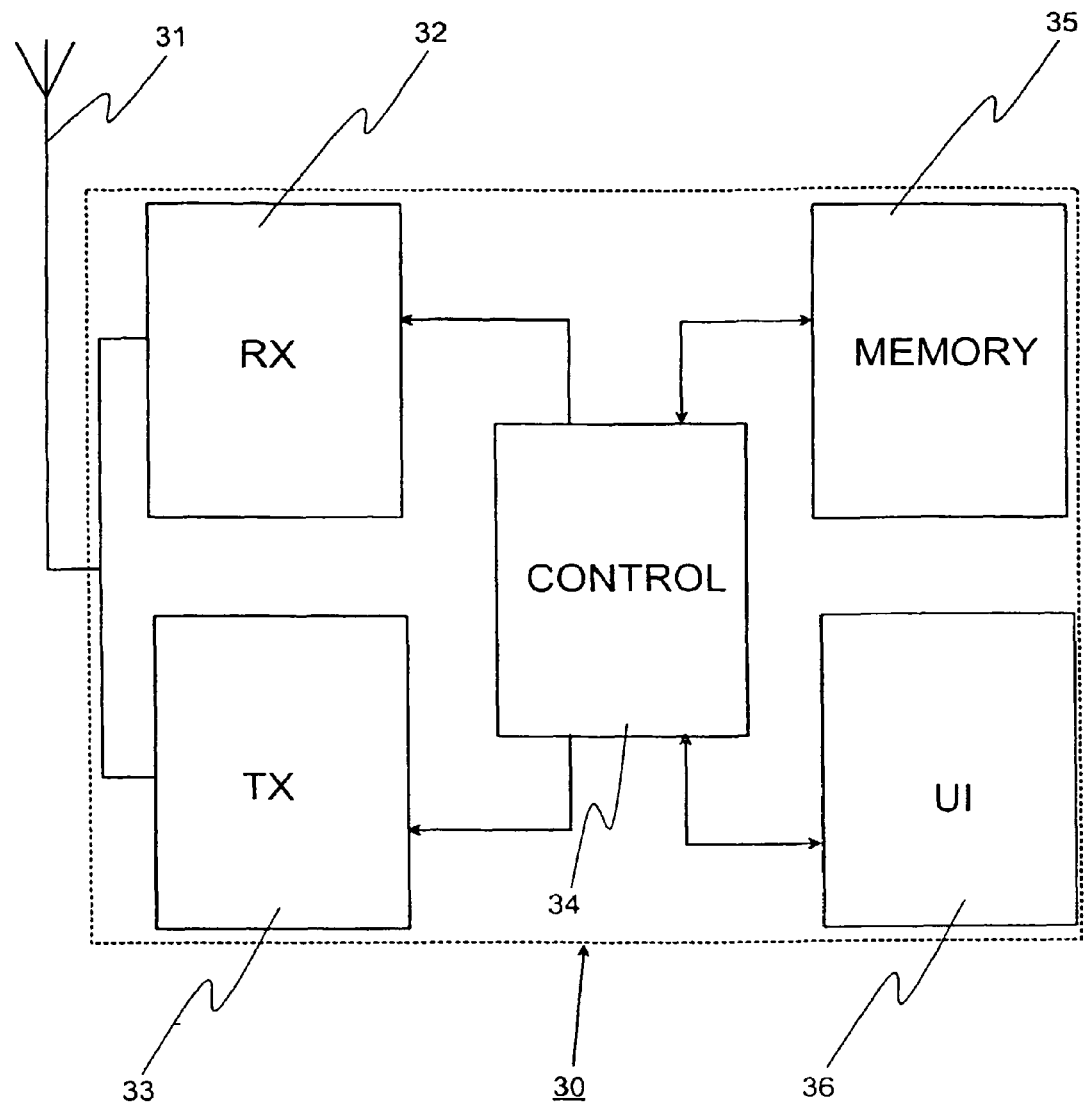
FIG. 3 shows an example of a terminal employing an adaptive network browser address field according to the invention.

The adaptive network browser address field according to the invention with function keys is advantageously applied in a cellular terminal 30 according to FIG. 3. For the most part, the terminal may be in accordance with the prior art. The block diagram of FIG. 3 shows, as an example, the main functional parts of the terminal 30. The cellular terminal 30 employs an antenna 31 for both transmission and reception.

Reference number 32 represents the means that constitute the receiver RX of the wireless-terminal 30 for receiving messages from a cellular network. The receiver RX comprises prior-art means for all signal processing functions to be carried out on signals received.

Reference number 33 represents the means that constitute the transmitter TX of the wireless terminal 30. The transmitter means 33 perform all the signal processing operations that are required on signals to be transmitted when communicating through a cellular network.

Operation of the wireless terminal 30 is controlled by a control unit 54 (CONTROL). It controls the operation of all main parts belonging to the terminal 30. It controls both reception and transmission. Furthermore, it is used to control the user interface 36 (UI) and memory 35 (MEMORY) of the terminal 30.

A network browser application according to the invention which includes an adaptive address field may run within the control unit 34 of the terminal 30. Applications not requiring a connection outside the terminal 30 may operate solely under the control unit 34. In that case the user interface 36 of the terminal 30 is modified in accordance with the application started at the terminal. Where an application requires an outside connection to a server via a communications network, the control unit 34 in a way operates as a slave processor under an application running at a server connected to the network. In that case the control unit 34 modifies the user interface 36 based on instructions from the server so that the UI is in accordance with the service selected.

Embodiments according to the invention were described above. The invention is not limited to the embodiments described. For example, there may be different services other than the examples discussed in the description and illustrated in the drawings. The inventional idea can be applied in numerous ways within the scope defined by the attached claims.

What is claimed is:

1. A method comprising:
   providing an adaptive address field and one or more virtual function keys via a user interface of a network browser running on a user device, wherein the virtual function keys are configured to initiate respective functions associated with the network browser;
   detecting data input in the adaptive address field;
   determining to access a network service application associated with the data input in the adaptive address field; and
   modifying the one or more virtual function keys to be configured to initiate respective functions associated with the network service application.

2. The method according to claim 1, further comprising:
   providing a function description field, via the user interface, indicating an operational mode of the network browser; and
   modifying the function description field to indicate an operational mode associated with the network service application.

3. The method according to claim 1, wherein the network service application controls the modification of the one or more virtual function keys.

4. The method according to claim 1, wherein the data entered in the adaptive address field comprises a network address.

5. The method according to claim 1, wherein data input fields of the network service application are accessed through the adaptive address field.

6. An apparatus comprising:
at least one processor; and
at least one memory including computer program code for one or more programs,
the at least one memory and the computer program code configured to, with the at least one processor, cause the apparatus to perform at least the following,
provide an adaptive address field and one or more virtual function keys via a user interface of a network browser running on a user device, wherein the virtual function keys are configured to initiate respective functions associated with the network browser;
detect data input in the adaptive address field;
determine to access a network service application associated with the data input in the adaptive address field; and
modify the one or more virtual function keys to be configured to initiate respective functions associated with the network service application.

7. The method according to claim 6, wherein the apparatus is further caused to:
provide a function description field, via the user interface, indicating an operational mode of the network browser; and
modify the function description field to indicate an operational mode associated with the network service application.

8. The apparatus according to claim 6, wherein the network service application controls the modification of the one or more virtual function keys.

9. The apparatus according to claim 6, wherein the data entered in the adaptive address field comprises a network address.

10. The apparatus according to claim 6, wherein data input fields of the network service application are accessed through the adaptive address field.

11. An apparatus of claim 6, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

12. A non-transitory computer readable storing medium carrying one or more sequences of one or more instructions which, when executed by one or more processors, cause an apparatus to at least perform the following:
providing an adaptive address field and one or more virtual function keys via a user interface of a network browser running on a user device, wherein the virtual function keys are configured to initiate respective functions associated with the network browser;
detecting data input in the adaptive address field;
determining to access a network service application associated with the data input in the adaptive address field; and
modifying the one or more virtual function keys to be configured to initiate respective functions associated with the network service application.

13. The non-transitory computer readable storing medium according to claim 12, wherein the apparatus is caused to further perform:
providing a function description field, via the user interface, indicating an operational mode of the network browser; and
modifying the function description field to indicate an operational mode associated with the network service application.

14. The non-transitory computer readable storing medium according to claim 12, wherein the network service application controls the modification of the one or more virtual function keys.

15. The non-transitory computer readable storing medium according to claim 12, wherein the data entered in the adaptive address field comprises a network address.

16. The non-transitory computer readable storing medium according to claim 12, wherein data input fields of the network service application are accessed through the adaptive address field.

* * * * *